(12) United States Patent
Berkheimer et al.

(10) Patent No.: US 7,399,935 B2
(45) Date of Patent: Jul. 15, 2008

(54) VINTAGE COIN RETURN POWER SWITCH

(75) Inventors: John Robert Berkheimer, Scottsdale, AZ (US); Miles Martin Elmers, II, Phoenix, AZ (US)

(73) Assignee: Tyrell Corporation, Phoenix, AZ (US)

( * ) Notice: Subject to any disclaimer, the term of this patent is extended or adjusted under 35 U.S.C. 154(b) by 479 days.

(21) Appl. No.: 11/230,955

(22) Filed: Sep. 19, 2005

(65) Prior Publication Data
US 2006/0075413 A1 Apr. 6, 2006

Related U.S. Application Data

(60) Provisional application No. 60/610,875, filed on Sep. 17, 2004.

(51) Int. Cl.
*H01H 13/02* (2006.01)
(52) U.S. Cl. .................. 200/308; 200/310; 200/314

(58) Field of Classification Search .............. 200/520, 200/329–331, 308–317, 296; 341/22; 345/156, 345/168–170; D14/388, 454, 483, 173–176, D14/188, 189, 200, 217; D21/516; 463/36, 463/37; 446/71, 143
See application file for complete search history.

(56) References Cited

U.S. PATENT DOCUMENTS

| | | | | |
|---|---|---|---|---|
| 2,906,538 | A | * | 9/1959 | Rockola ................. 40/374 |
| 5,417,605 | A | * | 5/1995 | Chan ..................... 446/136 |
| D463,395 | S | * | 9/2002 | Newcomb et al. .......... D14/173 |
| D560,651 | S | * | 1/2008 | Berkheimer et al. ....... D14/173 |

* cited by examiner

*Primary Examiner*—Michael A Friedhofer
(74) *Attorney, Agent, or Firm*—The Hill Law Firm PLC; Scott A. Hill

(57) ABSTRACT

The present invention integrates the power switch of a "vintage" coin operated device, such as a juke box, into a highly visible replica coin return button. This otherwise useless coin return feature is replaced with a specially designed keycap that is part of a full travel pushbutton switch.

14 Claims, 1 Drawing Sheet

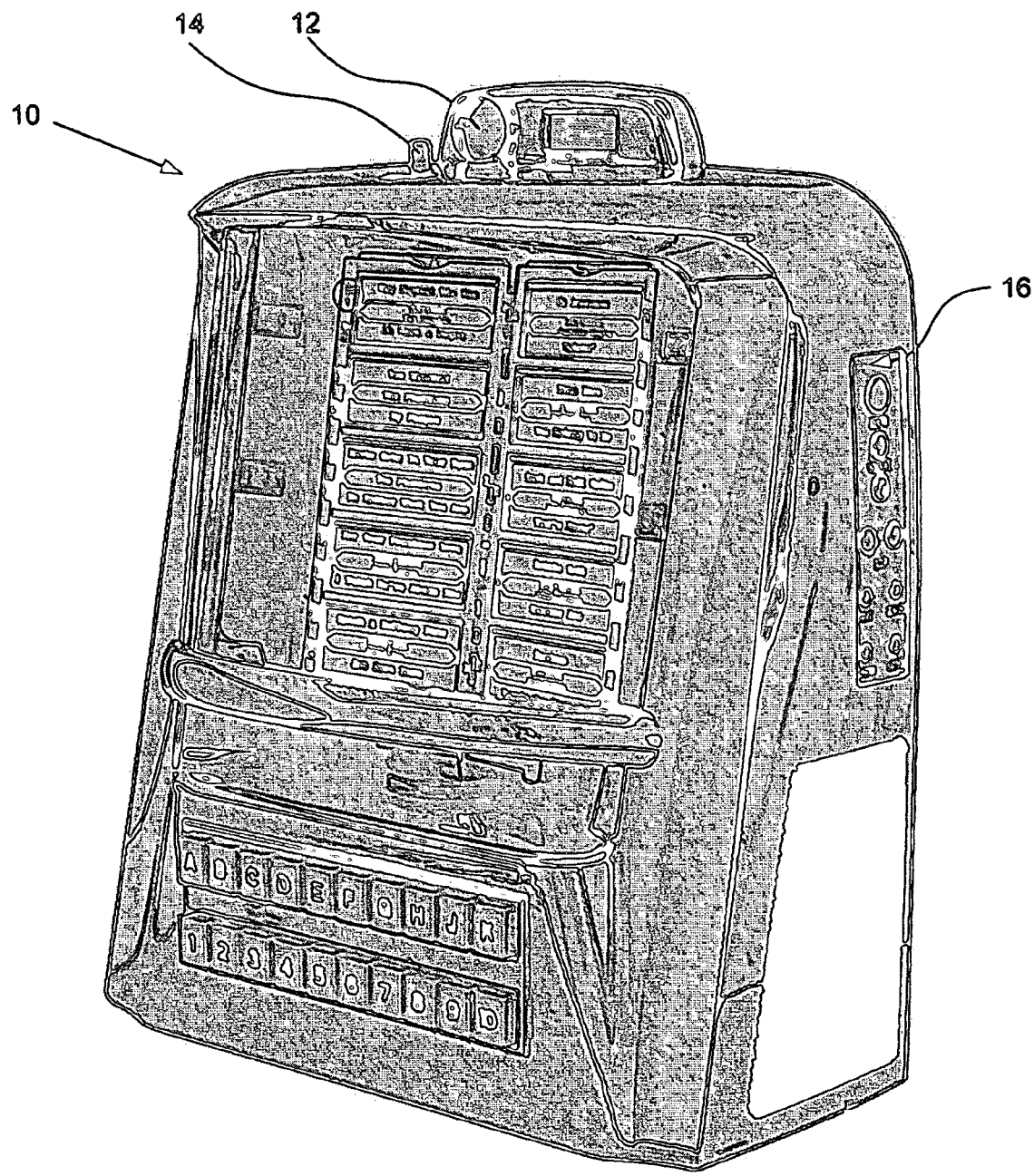

VINTAGE COIN RETURN POWER SWITCH

CROSS REFERENCE TO RELATED APPLICATION

The present application is related to and claims priority under 35 U.S.C. 119(e) to U.S. Provisional Patent Application Ser. No. 60/610,875 filed Sep. 17, 2004, entitled "DIGITAL AUDIO PLAYER", the contents of which are hereby incorporated by reference in their entirety.

BACKGROUND OF THE INVENTION

Numerous vintage devices, such as juke boxes, have been replicated to retain their unique styling. As the demand for these vintage styles increases, more and more new devices are being introduced that combine vintage features with current technology. Common vintage features that are almost always useless to a consumer are the coin slot and coin return button. For aesthetic value, these features are often included on replicas. Juke box systems are still popular, such as those shown and described in U.S. Pat. Nos. 6,031,795 and 6,587,403, but many modern juke boxes use CD's instead of records for the playback of music, so the internal workings of these juke boxes are based on more modern technology.

SUMMARY OF THE INVENTION

The current invention takes advantage of the highly visible character and location of the coin slot and coin return button on a vintage device. On new devices that replicate a vintage device, such as a wall box remote from a 50's diner juke box system, we uniquely use the coin return button as the power button for the entire device. By integrating the power switch into this highly visible feature, music can be instantly turned off, such as for when a user needs to answer a phone, without first glancing at numerous other buttons that perform system functions. Preferably, the coin return power switch uses a long-travel normally-open pushbutton switch. A light, such as an LED, may be mounted inside of the coin return button so that it is even more visible.

BRIEF DESCRIPTION OF THE DRAWING

The FIGURE is a perspective view the appearance of a juke box that incorporates the most preferred embodiment of the present invention.

The following is the menu of numerical callouts used in the FIGURE:
10 Juke box
12 Coin slot
14 Coin return button
16 System keypad

DETAILED DESCRIPTION OF THE INVENTION

The most preferred embodiment of the present invention, shown in the drawing FIGURE, is as a power switch for a juke box 10 that plays digital audio music, but that includes many of the vintage elements of a wall box remote from a 50's juke box. The coin slot 12 and coin return button 14 are located on the top of the unit, in plain site. Using substantially the same location for the coin return button, we have integrated the power switch for our juke box unit into a replica coin return button.

The replica coin return button is, in function, a full travel pushbutton switch having a specially designed keycap that protrudes through an aperture in the juke box. When a user presses the coin return button, power to the unit is turned on or off. The specially designed keycap can be made from a translucent plastic so that it can be illuminated by a small light that is part of, or near, the keycap. Other switches of the system have been located on a system keypad 16 that includes such functions as volume, skip, source, etc.

While a preferred form of the invention has been shown and described, it will be realized that alterations and modifications may be made thereto without departing from the scope of the following claims. For example, there are many additional "vintage" coin operated devices that could similarly be equipped with a coin return power switch.

What is claimed is:

1. A new use for a replica coin return button used with a juke box unit that combines elements of a vintage juke box unit with a digital audio player, comprising:
    a pushbutton switch that is integrated with the replica coin return button.

2. The new use of claim 1 wherein the pushbutton switch is normally closed.

3. The new use of claim 1 wherein the pushbutton switch is normally open.

4. The new use of claim 1 wherein the replica coin return button is characterized by a partially translucent plastic material.

5. The new use of claim 4 further comprising an LED that is capable of illuminating the replica coin return button.

6. A power switch, for a device that does not have a functional coin return mechanism, comprising:
    a pushbutton switch;
    an aperture; and
    a keycap used with the pushbutton switch that at least partially appears to be a coin return button.

7. The power switch of claim 6 wherein the pushbutton switch is located adjacent a non-functional coin slot.

8. The power switch of claim 7 wherein the keycap is at least partially translucent.

9. The power switch of claim 8 further comprising a light for illuminating the keycap.

10. The power switch of claim 6 wherein the device is a juke box.

11. A keycap, for use with a pushbutton switch, that appears to be coin return button from a vintage coin operated device.

12. The keycap of claim 11 wherein the keycap at least partially travels through an aperture that is substantially adjacent a non-functional coin slot.

13. The keycap of claim 11 wherein the coin slot is only decorative.

14. The keycap of claim 11 wherein the pushbutton switch is an on/off switch for a juke box.

* * * * *